United States Patent
Nelson

(10) Patent No.: US 8,447,014 B2
(45) Date of Patent: *May 21, 2013

(54) VOICE-OVER-IP (VOIP) SYSTEMS, COMPONENTS AND METHODS FOR PROVIDING ENHANCED LOCATION INFORMATION TO EMERGENCY RESPONDERS TO RESPOND TO EMERGENCY CALLS

(75) Inventor: Sherrie Lee Nelson, Lakewood, CA (US)

(73) Assignee: Paramount Pictures Corporation, Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/983,283

(22) Filed: Dec. 31, 2010

(65) Prior Publication Data

US 2012/0170719 A1 Jul. 5, 2012

(51) Int. Cl.
*H04M 11/04* (2006.01)
(52) U.S. Cl.
USPC .......................................... 379/45; 455/550.1
(58) Field of Classification Search
USPC ... 348/14.01–14.08, 14.09; 709/204; 370/352
See application file for complete search history.

(56) References Cited

U.S. PATENT DOCUMENTS

| 6,868,265 | B2 * | 3/2005 | Zodnik ...................... 455/404.1 |
| 7,260,186 | B2 | 8/2007 | Zhu et al. | |
| 2003/0012344 | A1 * | 1/2003 | Agarwal et al. ................. 379/37 |
| 2005/0085257 | A1 * | 4/2005 | Laird et al. ................. 455/550.1 |
| 2006/0293024 | A1 | 12/2006 | Benco et al. | |
| 2007/0121598 | A1 | 5/2007 | McGary | |
| 2007/0242660 | A1 | 10/2007 | Xu | |
| 2008/0037753 | A1 * | 2/2008 | Hofmann ................. 379/208.01 |
| 2009/0016517 | A1 | 1/2009 | Emmanuel | |
| 2010/0046506 | A1 | 2/2010 | Feldman et al. | |

OTHER PUBLICATIONS

Tiemey, A., "E911 Hosted Solutions Feature: VoIP Complicates Existing Glitch in 9-1-1 System," TMCnet.com (tmcnet.com/.../71130-911-hosted-solu...)(Dec. 16, 2009).

Cisco Emergency Responder 8.0 data sheet; Cisco Systems, Inc. (2009).

* cited by examiner

*Primary Examiner* — Curtis Kuntz
*Assistant Examiner* — Maria El-Zoobi
(74) *Attorney, Agent, or Firm* — Baker & McKenzie LLP

(57) ABSTRACT

Disclosed are systems and techniques for identifying VoIP phone connector locations whereby an emergency call request can be specifically located on a VoIP phone network. This system addresses prior-art shortcomings in which the location information is attempted to be tracked with identification information stored in VoIP phones, or in which databases of location information are created relative to MAC addresses of component pieces of the VoIP phone network (such as the VoIP phones themselves, data switches, or LAN routers) in that the VoIP phone connectors are fixedly mounted in buildings and their locations can be more reliably fixed and maintained. Further described are methods for establishing databases of location and/or caller information associated with these VoIP phone connectors. Still further described are VoIP phone server embodiments that enable the location and/or caller information to be determined according to the associated VoIP phone connectors and for that information to be transmitted both to public safety access points and to campus security networks, and for emergency calls to be bridged both to public safety access points and to campus security networks.

9 Claims, 4 Drawing Sheets

VOICE-OVER-IP (VOIP) SYSTEMS, COMPONENTS AND METHODS FOR PROVIDING ENHANCED LOCATION INFORMATION TO EMERGENCY RESPONDERS TO RESPOND TO EMERGENCY CALLS

TECHNICAL FIELD

The disclosed embodiments relate generally to an improved Voice-over-IP ("VoIP") data connector and VoIP phone system operable to detect an emergency (911) call, provide enhanced location information to emergency responders in response to emergency calls, and in certain embodiments to provide simultaneous location information and/or conference call connection to campus (corporate campus, university campus, or other organized group of buildings and/or floors) responders and to municipal or other government emergency responders.

BACKGROUND

In traditional "plain-old-telephone-systems" (POTS systems), it was relatively easy to implement 911 calling service because every incoming phone line (with the exception of long-ago-abandoned "party lines") corresponded to a physically connected analog phone. This was particularly true in residential systems, such that upon receiving a "911" call at the local telephone office, the caller location would be immediately known and could be conveyed to emergency responders. Specifically, with "enhanced 911" (e911) services, the telephone number of the caller is provided, and an Automatic Location Identification (ALI) database is used to look up the caller's street address and name information. This all works well in the fixed-line context, but as will be seen below, there have been shortcomings in the context of enterprise- or "campus"-type phone systems.

Enterprise or campus-type phone systems (businesses, hospitals, schools, etc.) also have emergency call routing needs, but such phone systems are typically "multiple line telephone systems" in which multiple analog or digital phones are connected with a "private branch exchange" or "PBX" phone switch. These systems have existed for decades, but there have not been effective ways in such systems to relay the specific campus location of a caller from such a system to an emergency responder. Until fairly recently, the only address sent to an emergency responder would have been the address associated with the "headquarters" or security desk associated with the PBX, although it is also possible for an enterprise to build its own ALI database information to the extent there is a dedicated phone number (or "Direct Inward Dial" or "DID" number) associated with each caller. But generally, the emergency responders would have to coordinate with the campus or enterprise security department, who also would lack specific location information on the emergency caller and would have had to use off-line methods (paging, sending out a patrol, etc.) to try to locate the emergency caller. Also, these human entries into the ALI or other database are subject to human error, which can further frustrate efforts to locate emergency callers.

Now with the advent of Voice-over-IP phones ("VoIP") that can be plugged into any network jack on an enterprise campus, any ALI database "maps" of phone locations that are maintained by the enterprise are subject to being inaccurate due to VoIP phones (either wired or wireless) being moved around on the campus. Attempts to address this problem have focused on placing location information into the VoIP phones themselves so that information can be transmitted with an emergency call. An example of this approach is a published patent application assigned to Lucent, US 2006/0293024 A1, to Benco et al. This application describes embodiments in which GPS tracking equipment is placed in the VoIP phone. But GPS does not generally work inside buildings, particular in the interior areas of the buildings, and it would not provide "floor" information within a multi-story building. And even GPS tracking information, although relatively accurate, still has an uncertainty window around it of about 15-30 feet. This variability is still enough to put emergency responders in the wrong room, wrong floor, or even the wrong building using GPS location information transmitted from VoIP phones as a part of an emergency call.

Another prior-art approach is described in a published patent application, US 2007/0242550 A1, to Xu. This application describes a system in which a VoIP phone (VoIP endpoint) determines to which network device and port number it is connected. Thus, presuming the location of the endpoint device is stored in an ALI database, a general location of the VoIP phone could be determined by knowing where the network device is located. Shortcomings associated with this approach, however, include the fact that network devices are frequently upgraded or replaced, and they are generally kept in a rack in a communications "closet," and there might be one or fewer such closets on each floor of a corporate building, and so keeping a database of the network devices and their port locations is prone to human error and lack of diligence in keeping that database up-to-date, and the location of a given network device will not provide sufficiently specific information for an emergency responder.

SUMMARY

This disclosure relates to devices, systems and methods using an improved VoIP data connector to provide location information from a detected emergency (911) call to emergency responders. The disclosed systems and methods include looking up location information from a database in order to identify the source location of the emergency call and passing that location information to a public safety answering point, such as that administered by a municipal or other local government, as well as in certain embodiments providing the source location information to a campus security site. In one embodiment, the location information is mapped to an emergency 911 map.

Systems disclosed in present specification include a plurality of VoIP telephones in communication with VoIP data connectors, with those network elements communicating with or connecting to a location database by means of a VoIP phone server and a local area network ("LAN"). The VoIP phone server is additionally connected to a public switched telephone network ("PSTN") and/or the Internet. The VoIP phone server is additionally configured to communicate with the public safety answering point and may further be configured to communicate with a campus security computer network and/or server.

Other described embodiments of the present application include, in the event of a detected emergency call, looking up location information from a database and providing the location information simultaneously (or effectively close in time) to campus security and a public safety answering point.

The described embodiments can be used with VoIP phones connected to wall outlets through standard VoIP/CAT5 or other phone cables, or by wireless means to wireless routers that effect the phone connections to the enterprise LAN network that implements the enterprise VoIP system.

In the context of emergency response, seconds can be crucial, and so it is imperative to minimize the opportunity for error and to minimize the effort it takes to build a database that provides an assured location for an emergency caller. As can be seen by the prior art discussion above, there is a long-felt need for being able to accurately locate an emergency caller, and this need has been what has spurred development of emergency 911 services. Prior disclosures relating to VoIP phone systems and emergency 911 systems have failed to disclose a system that can be confidently kept accurate and can be built with a minimum of human error, so accordingly the need for accurate 911 location information has remained unmet before the present invention.

The disclosure of the present application sets forth a system that minimizes human error in the building of a location database for emergency 911 VoIP callers, and it further ensures that the caller can be located despite the upgrade of network equipment and despite the ability for VoIP phones to be moved and plugged in at multiple locations in multiple buildings and in multiple-story LAN-connected enterprise, school, hospital, government or other types of campuses. This complication associated with VoIP phones is due to the fact that VoIP phones are assigned a phone number, which they maintain regardless of where they are plugged in. As such, emergency responders and others do not inherently know the location of a calling VoIP phone. Disclosed embodiments allow for the reliable and accurate detection of VoIP phone location, saving precious minutes or seconds for emergency responders in locating emergency callers.

BRIEF DESCRIPTION OF THE DRAWINGS

Reference is now made to the following detailed description of the preferred embodiments, taken in conjunction with the accompanying drawings. It is emphasized that various features may not be drawn to scale. In fact, the dimensions of various features may be arbitrarily increased or reduced for clarity of discussion. In addition, it is emphasized that some components may not be illustrated for clarity of discussion.

DETAILED DESCRIPTION

Figure 1:
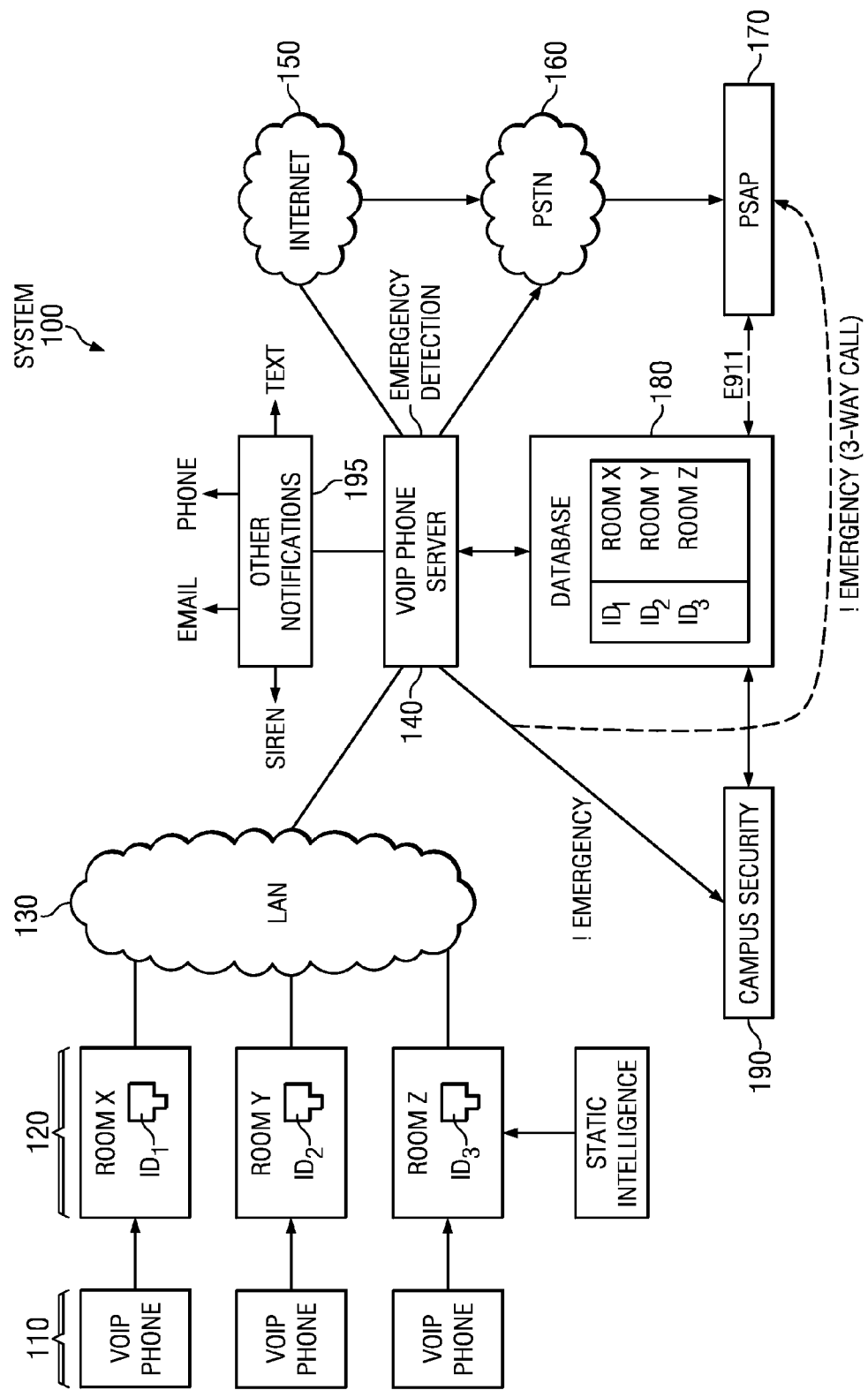
FIG. 1 is a graphical diagram illustrating systems for providing location information in the event of a detected emergency call.

FIG. 1 is a graphical diagram illustrating systems for providing location information in the event of a detected emergency call. In one embodiment, the system 100 comprises a VoIP telephone 110 communicating with or connected to VoIP data connector 120 by wireless connection or through an Ethernet cable. The VoIP phone might also communicate with the VoIP data connector 120 through wireless communication, such as the 802.11a/b/g/n wireless protocols or other wireless means. The VoIP telephone 100 is then able to access LAN 130 through VoIP data connector 120. Connected to the LAN 130 is a VoIP phone server 140 that is configured to receive a call from the VoIP telephone 110 and detect if the call is an emergency call. These connections are typically provided through LAN 130, with routing and switching elements comprising LAN data switches and network routers using known data networking equipment and techniques. Exemplary LAN data switches and data network routers are provided by companies such as Cisco, and current such data network products (as of the filing of this application) include their Catalyst 4500E Series, 4900M Series, ME 4900 Series, ME 6500 Series, and Catalyst 3750 Metro Series LAN switches and network routers.

Upon receiving a VoIP call request, the VoIP phone server 140 determines if an outgoing call is an emergency call. The phone server 140 is connected to the Internet 150 and/or public switched telephone network ("PSTN") 160. Non-emergency calls are routed as normal over one of those networks. VoIP phone servers may comprise specially adapted hardware systems for receiving and routing VoIP calls, or can comprise software applications installed on enterprise servers implemented in Linux or Windows. An exemplary VoIP server package known at the time of this application filing is the Cisco Unified Communications Manager.

Calls detected to be emergency (911) calls may be simultaneously transferred to campus security 190 and a public safety answering point 170 with location information being relayed via the location database 180. The present application provides for a system in which specific room location information, such as contained on a building floor plan and/or floor information or quadrant information can be specifically recorded and associated with each VoIP data connector 120. In an exemplary embodiment for making this association, each VoIP data connector may have a particular ID that is tied to and stored in the location database 180. This information can be used to specifically identify (e.g., by floor plan location, floor, and or floor quadrant/location information) the location within a campus site or multistory building, and that information can be transmitted to the emergency responders as a part of the location information transmitted from the VoIP phone server 140.

In cases where the campus, corporation, or other implementing entity has e911 services, emergency calls are routed over e911 trunks in which the data from location database 180 is passed along to public safety answering point 170 with the physical location of the outgoing emergency call. If the customer does not have e911 services, emergency calls are routed over PSTN 160 to the public safety answering point 170 with generic information that typically includes the customer's telephone number and physical address. If the customer has e911 services, there can be additional specific information given (building number, floor number, room number, etc).

In described embodiments, emergency calls may be concurrently made, or routed or relayed at or about the same time, to both of a campus security network 190 and a public safety answering point 170. If campus security is simultaneously connected with the public emergency responders, then campus security can join in the emergency call. This allows campus security 190 to pass on pertinent information to the public safety answering point 170 dispatcher, who can then forward that information on to non-campus emergency responders, information such as building entrance locations or other possible emergency information. It would also allow campus security to provide pertinent information to the emergency responders if the caller is unable to speak.

Along with the information contained in database 180, emergency calls made from VoIP telephone 110 by means of VoIP data connector 120 (which is directly identified in the VoIP data network 100) can direct the exact location of the outgoing emergency call to campus security 190 and public safety answering point 170. The link to the public safety answering point 170 can be via an e911 trunk or other communications link, such as to a specially adapted server at the public safety answering point 170. This is an improvement over prior VoIP systems, because in prior VoIP systems if a VoIP phone or terminal is relocated there was no reliable means to confirm the exact location from which an emergency call originated. The implications of emergency responders being unable to go directly and certainly to the correct location would mean that in instances that they would go to the wrong location and that they and/or campus security would have to search for the emergency caller, losing precious time in responding to the reported emergency, potentially leading to loss of life, limb, or other serious consequences. In addition to the conveying of the accurate caller location in the event of an emergency call to a public safety answering point 170 and/or campus security 190, the VoIP phone server 140 can create an emergency alert through another notification server 195 to broadcast a message out, campus-wide or to specific campus personnel or occupants, via strobe lights, bells, sirens, email, phone, public address systems and/or speakers, or text messaging.

By this approach the emergency notification system can provide broadcast or specific emergency notifications, and those notifications can also include more specific information in accordance with the location information that has been recorded relative to location of the VoIP network connector 120 within the campus system. Further, again due to the increased accuracy and certainty of the data stored in the ALI database due to the improved systems and methods described herein, an accurate and targeted reverse-911 notification system could be employed, where emergency calls could be specifically targeted at phones in increasingly narrow areas of the campus—areas where in particular contexts the information specificity of the notifications will be particularly effective such as to evacuate those portions of a building under fire that have not yet been consumed or to evacuate other floors in a building contaminated in a hazmat event or rendered potentially unstable in an earthquake. For example, if receiving an emergency call from a certain office, that office can be identified with specificity using the teachings of this application, and by the same token emergency calls can be placed using reverse-911 techniques and the accurate database information, and those emergency calls can be targeted specifically at offices neighboring the office from which the emergency call was made. Again, this is just an example of an approach that can be employed using reverse-911 techniques. The specific and accurate information in the ALI database can enable many uses of the information for reverse-911 notifications.

In implementing communications between the VoIP phone server 140 and the VoIP data connectors 120, protocols are implemented. One approach is to enhance or improve the VoIP phone server's software functionality. Another approach is to implement the additional functionality with a separate piece of equipment or a separate software protocol for communicating with the VoIP data connector 120 embodied in one or more applicable components of the system 100. The separate piece of equipment or protocol could communicate through the data communication network to query information from the VoIP data connector 120, such as that specific VoIP data connector's ID. This separate tool could also add the flexibility to work with multiple phone systems, while still allowing the use of standard VoIP phone servers that have historically been implemented to provide VoIP call routing in campus VoIP call networks—the standard VoIP phone server could then communicate using an API or other interface with the specific protocol, and collectively these two pieces would provide the VoIP phone server 140 functionality illustrated in FIG. 1. Through this approach, a location database 180 can be maintained in the same "new functionality" element that provides the bridging of an emergency call to campus security 190, public safety answering point 170, and other notification server 195.

The emergency call system for VoIP phone server 140 is capable of instituting a 3-way call between public safety answering point 170, campus security 190, and the call at VoIP phone 110. All three parties can talk to each other and communicate the nature of the emergency and how to handle it.

Figure 2:
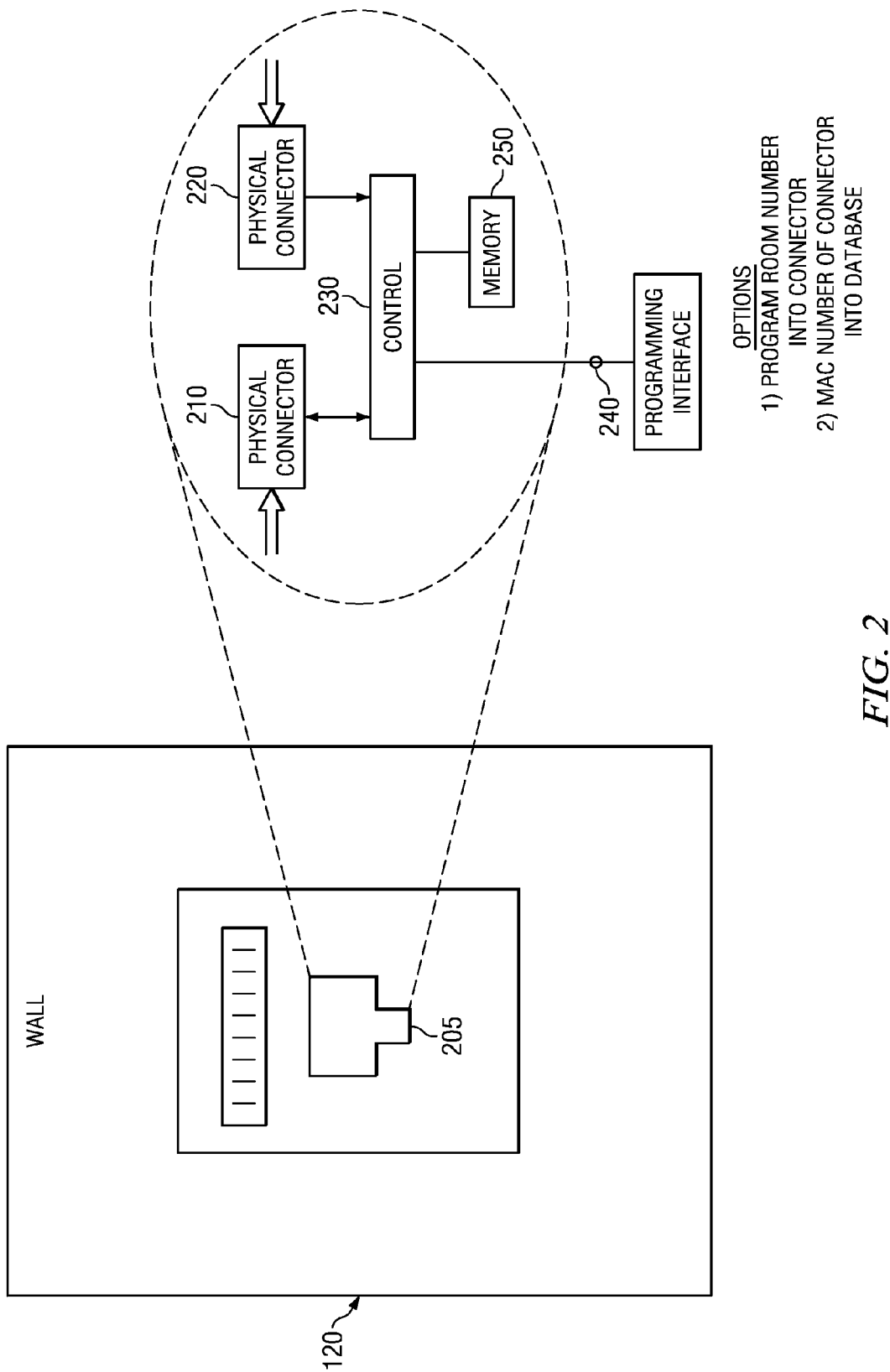
FIG. 2 is a graphical diagram illustrating the VoIP data connector of FIG. 1.

FIG. 2 is a graphical diagram illustrating the VoIP data connector 120 of FIG. 1. One embodiment of the VoIP data connector 120 is a physical jack as would normally be seen in existing constructions. Such connectors are placed in the walls of buildings with a physical RJ-45 jack, and accordingly, are operable to receive Cat5 or Cat6 cables plugged into them. To provide additional and more specific location data within the VoIP data connector 120, a type of nonvolatile memory is provided in the VoIP data connector 120, and as described above, communication to the location database 180, such as through the VoIP phone server 140 or other network control system is provided through an Ethernet cable (typically in this case through the in-wall wiring for the LAN).

Included in the VoIP data connector 120 are connectors 210 and 220. For the wired embodiment, an Ethernet (e.g., CAT5) cable is plugged into a physical connector 210 while other physical connector 220 sends pertinent information to the network communications as described above through the in-wall Ethernet cable. Although connectors 210 and 220 are shown in FIG. 2, pertinent information may be transmitted through a single connector (such as by interleaving respective information and data) and processed by applicable software. In a wireless embodiment, a wireless communication link 210 receives communications from and transmits communications to the VoIP phone 110 over a wireless communications channel, such as one provided under the 802.11a/b/g/n protocols. The connector 210 or wireless communication link 210 is in communication with controller 230, which comprises electronic intelligence for programming a memory 250 such as ROM, EPROM, EEPROM, magnetic memory, memristor, or any type of memory that can retain its contents when power is removed. Connector 210 might also be provided through a wireless communications circuit communicating with a wireless network 130.

The controller 230 can receive programming commands from an external interface 240, or it may be operable to communicate over the physical connectors 210, 220 (or wireless communication link 210) using networking protocols, such as TCP/IP communications protocols, to communicate with a programming laptop (such as could be used by an installer) or with the VoIP server 140. The programming task could be performed in part, for example, by the VoIP server 140 which might identify missing VoIP data connectors in the database 180 or which might identify possible data inconsistencies. The programming could then be completed by an on-site installations or maintenance technician who could physically confirm locations and program the specific VoIP data connection using a direct physical connection 240 or a wireless (e.g., Bluetooth) connection 240. As a part of the on-site installations, the technician could use a barcode scanner with the programming laptop to input location information from a barcode on a building floor plan or affixed to a physical location in the building. Other barcode identification information could be placed on materials (such as a box) associated with each of the VoIP data connectors 120. These identifications could be coupled in a database associated with the locations of the VoIP data connectors 120.

Still referring to FIG. 2, in the present embodiment an additional functionality of the control circuitry 230 is to provide Internet-protocol transmissions with the VoIP server 140. Specifically, the control circuitry 230 provides within the outgoing (from the VoIP phone 110) communications a packet stream that includes an identifier for the VoIP data terminal 120 that allows the location information to be determined from the database 180.

Since power would generally be needed for the memory 250 and/or control circuitry 230 within the VoIP data connectors 120, the described Ethernet cables are capable of being the power source needed for the electronics in VoIP data connector 120. This is implemented by the use of a Power-over-Ethernet ("PoE") switch that sends power through the Ethernet or LAN cable wires to an endpoint, which is the central method for how many VoIP phones 110 are powered. For the presently described system, the "endpoint" of interest is the VoIP data connector 120, which also derives its power from the PoE network connections to run intermediate electronics in the VoIP data connector 120 such as the nonvolatile memory 250 and access circuitry for communicating with the nonvolatile memory 250. In other embodiments, the VoIP data connector 120 can include, depending on context and design needs, battery power, solar power, RF-coupled power and other powering means, particularly in non-PoE environments.

Referring further to FIG. 2, it can be seen that when a device is programmed through the connector 210, then the programming device connected to it may pull of the VoIP data connector's 120 identifier, whether that identifier is a media access control ("MAC") address or a physical identifier. The nonvolatile memory 250 and the location database 180 may be programmed at the time of installation with the physical location and/or identification of the VoIP data connector 120. Each VoIP data connector 120 has its own MAC address that would serve as a network element when a programming laptop is plugged in and is then able to pull that MAC address from the VoIP data connector 120. The programming might also be accomplished fully or in-part through the VoIP server connection 220 on the network side. Also, as previously mentioned, the connector 210 could be a wireless circuit and the programming could be accomplished through wireless means.

With the programming, the MAC address associated with the VoIP data connector 120 can therefore be stored in the location database 180 associated with the physical location of the VoIP data connector 120 itself. The installation programming would serve to narrow the possibility of human error for entering the location of a network connected device/the VoIP data connector 120. The physical address could accordingly be checked and double-checked for accuracy at installation. Further, since the VoIP data connector 120 would generally be physically installed in the wall of the building, it would be a static piece that is not subsequently moved or replaced (as contrasted to VoIP phones that could be moved around within a campus).

Figure 3:
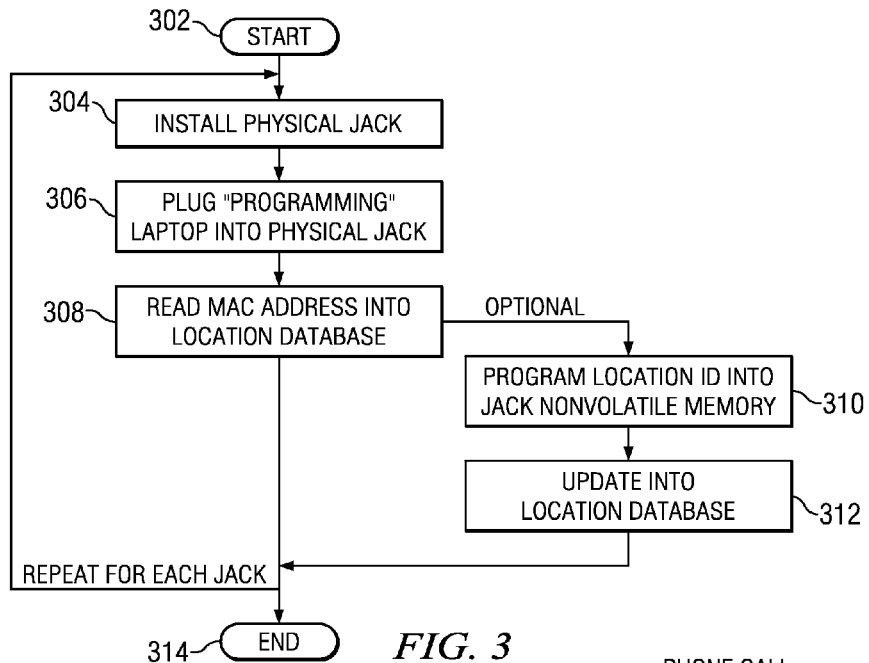
FIG. 3 is a flow diagram illustrating methods of installation of the VoIP data connector of FIG. 2.

FIG. 3 is a flow diagram illustrating methods of installation of the VoIP data connector 120 of FIG. 2. During the start of build-out phase 302, step 304 comprises the installation of a physical jack in the wall of a building, which further consists of completing the connection (e.g., wired or wireless) for the VoIP data connector 120. Step 306 comprises accessing the VoIP data connector 120 to program it, such as by connecting a programming laptop (e.g., a laptop or other computing device carried by the electronics installation team member) or remote programming from the VoIP server. Step 308 comprises of reading and recording the MAC address or other identifier of that particular VoIP data connector 120, such as by the installation team member using the programming laptop, into the location database 180. At this point, optional step 310 programs the location ID, office room number, and building location to the nonvolatile memory 250 of VoIP data connector 120. Further, step 312 updates the data associated with step 310 or preceding steps into the location database 180. Each of these steps is then repeated for the plurality of VoIP data connectors 120 on campus. When the last VoIP data connector 120 has been programmed, end step 314 has been reached. Although the process is described above as being sequential, i.e., repeating individual programming of each of the multiple VoIP data connectors 120, it should be understood that multiple VoIP data connectors could be programmed in parallel, or at the same time. This could occur with individual programming equipment at the direction of a technician, or it could be an automatically done by a centralized server, such as the VoIP phone server 140.

Depending on design goals for the overall system, the VoIP data connector 120 may or may not "advertise" the MAC address continuously. In other words, the issue is whether the networking component in the VoIP data connector 120 provides continuous information to the network about its presence on the network, including its MAC address. Given that over TCP/IP data networks, devices included within the networks have a MAC address that is unique to them, this is a design choice and connected devices may, but need not always, be visible to other network elements. If a device is "advertising" its MAC address, it is signaling its entrance onto the network. The plugged-in device can then request an IP address if it is a DHCP-type device, or its static IP address would otherwise be established on the network. Once an Ethernet cable is plugged into the VoIP data connector 120 and it announces both its MAC and IP addresses, the physical location of the outgoing emergency call can be matched to the particular VoIP data connector 120 in order to direct campus security 190 and the public safety answering point 170 to the emergency location.

Because many campuses have a surplus of jacks, having each and every jack advertise its MAC address would a waste of power consumption, so in an embodiment of the presently described system, each VoIP data connector 120 can be activated upon, for example, the connection of an Ethernet cable into it. Thus, once the pins inside the VoIP data connector 120 come into contact with the pins from the Ethernet cable, the VoIP data connector 120 then determines that it is in use and only then begins advertising its MAC address. This also addresses the issue of whether to power the electronics in the VoIP data connector 120 during down times. Since the described nonvolatile memory 230 type memory for storing the VoIP network connector 120's identification, the memory 230 would not then need a consistent power source for upkeep of necessary data, and therefore the connectors 120 only need to be powered during times of actual use.

In another implementation of the VoIP data connector 120, circuitry can be provided within the connector to only power on when an Ethernet cable is plugged in AND there are communications signals being generated at the other side of the inserted cable. This would preserve power in the event that an Ethernet cable is plugged the RJ-45 connector of a VoIP data connector 120, but there is nothing at the other end of the cable.

Figure 4:
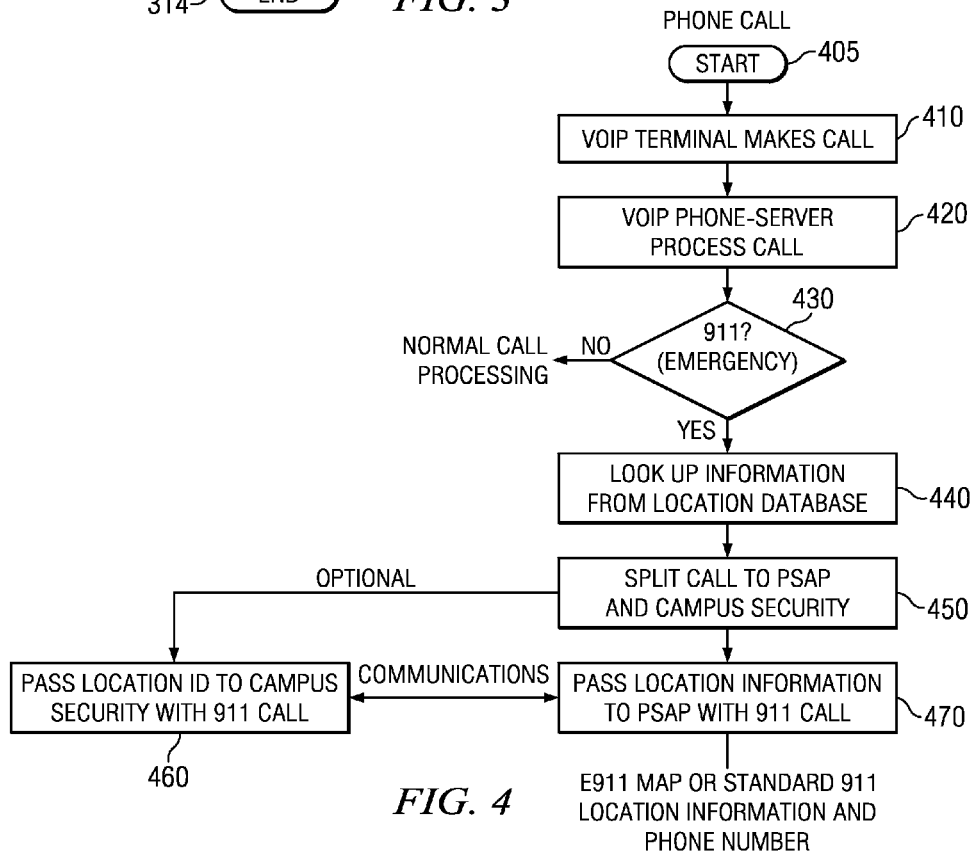
FIG. 4 is a flow diagram illustrating methods of splitting emergency calls and providing location information of FIG. 1.

FIG. 4 is a flow diagram illustrating methods of splitting emergency calls and providing location information such as over the disclosed system illustrated in FIG. 1. The start of the process is at block 405. Action 410 then begins with a user using a VoIP phone 110 to make a call. This call is routed at action 420, where the VoIP phone server 140 processes the call. Next, the decision action 430 determines if the call is a 911 emergency call or a standard, non-emergency call. If the call is deemed to be a non-emergency call, then the call proceeds with normal call processing. If the call is deemed to be an emergency call, then the call proceeds at action 440 where information in the location database 180 associated with the VoIP data connector 120 is accessed. After action 440, in an embodiment action 450 splits the call to public safety answering point 170 and campus security 190. The optional action 460 further passes the location ID of the VoIP data connector 120 to campus security 190. Regardless of whether optional step 460 is performed or not, step 470 passes the location information of the VoIP data connector 120 to public safety answering point 170 with the location ID also being passed on. This information could be passed over existing e911 trunks, or through other data communications channels, to the public safety answering point 170.

If the campus has e911 trunks, the caller's actual physical location (as determined by the VoIP network connector 120), including location information such as room number, floor, building coordinate, etc., can be passed over to the public safety answering point 170. If the caller does not have e911 trunks and the emergency call is being transmitted over standard PSTN lines, an abbreviated group of location information, such as the physical address of the building on the campus, is passed on to the public safety answering point 170. Even in cases, however, where e911 trunks are not available, by the VoIP phone server 140 equipment and functionality making a three-way bridge between the caller, the public safety answering point 170, and campus security 190, all three parties can communicate with each other and in particular the campus security can coordinate with the municipal or other emergency government responders to directly proceed to the exact emergency location by the information that can be gleaned from the database 180 and communicated to the campus security 190 in accordance with the physical location of the caller connected to the VoIP network connector 120. In such cases, and even more particularly in cases where the user in step 410 is unable to communicate, the campus security 190 can communicate with public safety answering point 170 and notify emergency responders of a quick entrance route or perhaps direct the emergency responders to the building, floor, and/or room number or building coordinates on the campus.

Figure 5:
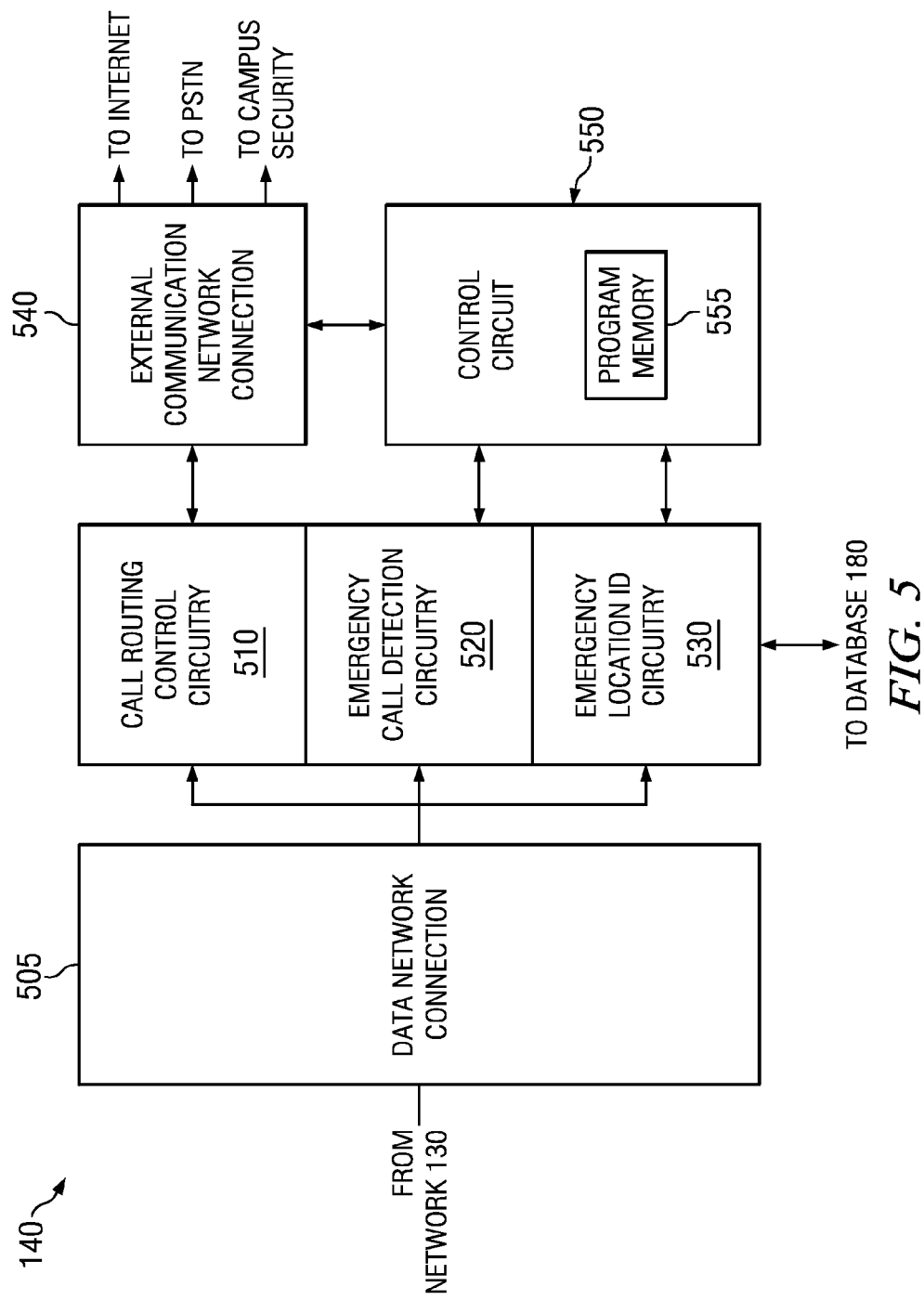
FIG. 5 is a more detailed schematic diagram of a VoIP phone server operable in accordance with the principles described.

FIG. 5 more specifically illustrates the VoIP server 140. This figure more specifically describes the VoIP server 140 and its operation in the system 100 and methods for its operation on the system 100 in accordance with the previously described embodiments. In accordance with the embodiment illustrated in this figure, the VoIP server 140 is connected to the network 130 and is operable to communicate with VoIP phones 110 to receive VoIP call requests and to make VoIP call connections to the VoIP phones 110. The VoIP server 140 is further operable to communicate with VoIP phone connectors 120 on the network to receive identifiers or other location information from the VoIP phone connectors 120. As previously discussed, the VoIP phone connectors 120 are fixedly mounted in a building hosting the data network 130. The VoIP phone connectors 120 are interposed between the VoIP phones 110 and the network 130; more specifically, the VoIP phone connectors 120 are interposed between the VoIP phones 110 and the LAN routers that comprise the fabric of the LAN network 130.

The VoIP phone server 140 comprises a network connection 505 that is operable to receive data, including the VoIP call requests and the identifier or location information, from the network 130. The VoIP phone server 140 also comprises several logic circuits in communication with the data connector 505. Specifically, the VoIP phone server 140 comprises call-routing control circuitry 510 in communication with the network connection 505. The call-routing control circuitry 510 is operable to receive and route the received VoIP call requests. The call-routing control circuitry 510 is operable to connect calls in accordance with the received call requests, as well as to route received calls to the VoIP phones 110. In most cases, the outgoing routed calls will be sent through the external communication network connection 540 via the Internet or via the Public Switched Telephone Network ("PSTN") and connected as normal placed calls.

The VoIP phone server 140 further comprises emergency call detection circuitry 520 is also provided in communication with the network connection 505. The emergency call detection circuitry 520 is operable to detect an emergency call request from among the received call requests. The actions of the emergency detection circuitry 520 is under the control of control circuitry 550, which further comprises program memory 555, which is a computer-readable medium operable to store a computer program comprising computer instructions that when executed by the control circuitry 550 operating as a microprocessor causes the control circuitry to perform the actions for instructing and directing the VoIP phone server components in accordance with the embodiments described herein.

Upon receipt of a detected emergency call request, control circuitry 550 directs the emergency location identification circuitry 530 to access database 180 to retrieve information about the emergency caller's location and other information stored therein. This information is accessed according to the identification and/or location information associated with the VoIP phone connector 120. With the information accessed in the database 180, it can be determined specifically where on the corporate, school, hospital, or other campus or building, the emergency caller is located.

With further reference to FIG. 5, the control circuitry 550 directs the emergency location identification circuitry 530 to route the emergency call through the external communication network 540 to a public safety answering point 170 and to further communicate the location information and/or caller information to the public safety answering point 170. In certain embodiments, the control circuitry 550 is further operable according to other instructions stored in the computer readable medium 555 to further direct the emergency location identification circuitry 530 to communicate the location information and/or caller information to a campus security network 190 to campus security 190's server, switchboard, or other communications equipment. This communication could be through the external communication network connection 540 as illustrated, or it could be through an internal campus network, such as the previously described and illustrated network 130.

In an embodiment, the control circuitry 550 is further operable to direct the VoIP phone server to make a three-way emergency call from a caller originating the emergency call to both a public safety answering point 170 and to a campus security network 190. By making this "conference call," the actions of the public responders can be efficiently coordinated with those of a campus/enterprise security organization, thus for example the campus/enterprise security group can meet the public responders at a main access point to the enterprise's building or campus and to further aid the responders in locating the site of the emergency. Again, such connections could be made through the external communication network 540, or for internal enterprise elements connected through the three-way or other multiple-line conference call, such communication channels could be established through the previously described and illustrated network 130.

Although the database 180 is shown in FIG. 5 as being connected to the VoIP server 140, it could advantageously be embodied within the VoIP server 140, e.g., an integrated database may be sold as a part of a VoIP server. The computer-readable medium 555 of the control circuitry can include software that is loaded as a part of VoIP software application, and it can also include firmware, and it can include both. Providing a computer-readable medium 555 allows software and/or firmware, including a VoIP server's BIOS to be upgraded to accomplish the functions described in embodiments herein. For example, in a currently existing VoIP system, instructions can be provided and stored in a computer readable medium to accomplish the described actions of communicating with the VoIP phone connectors 120, including the programming of such connectors 120 and the reading of identifiers and location information from those connectors 120. Thus, accordingly, VoIP phone servers 140 can be upgraded via computer-readable media to accomplish the above-described functions, or such servers 140 can be built and distributed having this functionality embedded in control circuitry with or without computer-readable media embodying the instructions for accomplishing the functions described herein. Further, while the VoIP phone server 140 and database 180 are described as being located at the enterprise site, these machines, or some of their functionality, can be placed remotely from the enterprise site and/or embedded in a cloud computing application.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Also as referred to herein, a server is a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

While communication protocols may be described herein, the coverage of the present application and any patents issuing there from may extend to other local-area network, wide-area network, or other network operating using other communications protocols.

Services and applications are described in this application using those alternative terms. Services can be java services or other instances of operating code. A service/application is a program running on a machine or a cluster of machines in a networked computing environment. Services may be transportable and may be run on multiple machines and/or migrated from one machine to another.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method for configuring a data network having a plurality of data network connectors, the data network connectors being configurable to communicate an identifier or location information to a voice server to facilitate accurate location of emergency callers on the data network, the method comprising:

for each of a plurality of data network connectors, determining an identifier or location information to be associated with the data network connector, whereby the data network connector is operable to communicate its identifier or location information in connection with an emergency call placed through the data network connector;

establishing or updating a database of location information for the plurality of data network connectors, the database being accessible by a voice server whereby the voice server can access specific location information upon receipt of an emergency call and upon receiving an identifier or location information from the data network connector through which the emergency call was placed; and reading, using a programming laptop, an identifier from the plurality of data network connectors, and storing location information in the database for each of the plurality of data network connectors;

wherein said reading comprises using a barcode scanner with the programming laptop to input location information from a barcode on a building floor plan or from a physical location in the building.

2. A method for configuring a data network having a plurality of data network connectors, the data network connectors being configurable to communicate an identifier or location information to a voice server to facilitate accurate location of emergency callers on the data network, the method comprising:

for each of a plurality of data network connectors, determining an identifier or location information to be associated with the data network connector, whereby the data network connector is operable to communicate its identifier or location information in connection with an emergency call placed through the data network connector;

establishing or updating a database of location information for the plurality of data network connectors, the database being accessible by a voice server whereby the voice server can access specific location information upon receipt of an emergency call and upon receiving an identifier or location information from the data network connector through which the emergency call was placed; and reading, using a programming laptop, an identifier from the plurality of data network connectors, and storing location information in the database for each of the plurality of data network connectors;

wherein said reading comprises using a barcode scanner with the programming laptop to input identification from a barcode having a data network connector identifier on it.

3. A method for configuring a data network having a plurality of data network connectors, the data network connectors being configurable to communicate an identifier or location information to a voice server to facilitate accurate location of emergency callers on the data network, the method comprising:

for each of a plurality of data network connectors, determining an identifier or location information to be associated with the data network connector, whereby the data network connector is operable to communicate its identifier or location information in connection with an emergency call placed through the data network connector;

establishing or updating a database of location information for the plurality of data network connectors, the database being accessible by a voice server whereby the voice server can access specific location information upon receipt of an emergency call and upon receiving an identifier or location information from the data network connector through which the emergency call was placed; and reading, using a programming laptop, an identifier from the plurality of data network connectors, and storing location information in the database for each of the plurality of data network connectors;

wherein said reading comprises using a wireless scanner with the programming laptop to input the identifier from the data network connector.

4. A network-accessible device configured to communicate on a data network with a voice server using a data network connector fixedly mounted to a surface defined in a room of a campus hosting at least a part of the data network, the network-accessible device comprising:

voice calling circuitry operable to make voice call requests and, upon being connected through the voice server, to provide a voice call between the caller and a called party;

emergency calling circuitry operable to make emergency call requests and, upon being connected through the voice server, to provide an emergency call between the caller and a public safety answering point; and a network connection configurable to communicate with the data network connector to make call requests and provide a location identifier of the data network connector through which the call request was made;

wherein the network-accessible device is operable to determine a data network connector that is closest to the network-accessible device.

5. A network-accessible device configured to communicate on a data network with a voice server using a data network connector fixedly mounted to a surface defined in a room of a campus hosting at least a part of the data network, the network-accessible device comprising:

voice calling circuitry operable to make voice call requests and, upon being connected through the voice server, to provide a voice call between the caller and a called party;

emergency calling circuitry operable to make emergency call requests and, upon being connected through the voice server, to provide an emergency call between the caller and a public safety answering point; and a network connection configurable to communicate with the data network connector to make call requests and provide a location identifier of the data network connector through which the call request was made;

wherein the network-accessible device is operable to determine a data network connector that is closest to the network-accessible device and make the call request by selecting the closest data network connector.

6. A network-accessible device configured to communicate on a data network with a voice server using a data network connector fixedly mounted to a surface defined in a room of a campus hosting at least a part of the data network, the network-accessible device comprising:

voice calling circuitry operable to make voice call requests and, upon being connected through the voice server, to provide a voice call between the caller and a called party;

emergency calling circuitry operable to make emergency call requests and, upon being connected through the voice server, to provide an emergency call between the caller and a public safety answering point; and a network connection configurable to communicate with the data network connector to make call requests and provide a location identifier of the data network connector through which the call request was made;

wherein the network-accessible device is operable to determine a data network connector that is closest to the network-accessible device and make the call request by selecting the closest data network connector; and wherein upon the voice server receiving the location identifier of the closest data network connector, accessing a location database to determine campus location information associated with the selected closest data network connector and providing the campus location information to the called party.

7. A network-accessible device configured to communicate on a data network with a voice server using a data network connector fixedly mounted to a surface defined in a room of a campus hosting at least a part of the data network, the network-accessible device comprising:

voice calling circuitry operable to make voice call requests and, upon being connected through the voice server, to provide a voice call between the caller and a called party;

emergency calling circuitry operable to make emergency call requests and, upon being connected through the voice server, to provide an emergency call between the caller and a public safety answering point; and a network connection configurable to communicate with the data network connector to make call requests and provide a location identifier of the data network connector through which the call request was made;

wherein the network-accessible device is operable to determine a data network connector that is closest to the network-accessible device and make the call request by selecting the closest data network connector;

wherein upon the voice server receiving the location identifier of the closest data network connector, accessing a location database to determine campus location information associated with the selected closest data network connector and providing the campus location information to the called party; and wherein upon making the call request and being connected through the voice server to the called party using the closest data network connector, providing a different location identifier representing a new closest data network connector to the voice server when the new closest data network connector becomes the closest data network connector to the network-accessible device.

8. A network-accessible device configured to communicate on a data network with a voice server using a data network connector fixedly mounted to a surface defined in a room of a campus hosting at least a part of the data network, the network-accessible device comprising:

voice calling circuitry operable to make voice call requests and, upon being connected through the voice server, to provide a voice call between the caller and a called party;

emergency calling circuitry operable to make emergency call requests and, upon being connected through the voice server, to provide an emergency call between the caller and a public safety answering point; and a network connection configurable to communicate with the data network connector to make call requests and provide a location identifier of the data network connector through which the call request was made;

wherein the network-accessible device is operable to determine a data network connector that is closest to the network-accessible device and make the call request by selecting the closest data network connector;

wherein upon the voice server receiving the location identifier of the closest data network connector, accessing a location database to determine campus location information associated with the selected closest data network connector and providing the campus location information to the called party;

wherein upon making the call request and being connected through the voice server to the called party using the closest data network connector, providing a different location identifier representing a new closest data network connector to the voice server when the new closest data network connector becomes the closest data network connector to the network-accessible device, and accessing the location database to determine campus location information associated with the new closest data network connector and providing the campus location information associated with the different location identifier to the called party.

9. A network-accessible device configured to communicate on a data network with a voice server using a data network connector fixedly mounted to a surface defined in a room of a campus hosting at least a part of the data network, the network-accessible device comprising:

voice calling circuitry operable to make voice call requests and, upon being connected through the voice server, to provide a voice call between the caller and a called party;

emergency calling circuitry operable to make emergency call requests and, upon being connected through the voice server, to provide an emergency call between the caller and a public safety answering point; and a network connection configurable to communicate with the data network connector to make call requests and provide a location identifier of the data network connector through which the call request was made;

wherein the network-accessible device is operable to determine a data network connector that is closest to the network-accessible device and make the call request by selecting the closest data network connector; and wherein the selected data network connector that is closest to the network-accessible device is further operable to prevent the network-accessible device from making the call request using other data network connectors.

* * * * *